United States Patent
Kim et al.

(10) Patent No.: US 7,847,882 B2
(45) Date of Patent: Dec. 7, 2010

(54) BACKLIGHT ASSEMBLY, LIQUID CRYSTAL DISPLAY APPARATUS HAVING THE SAME, AND METHOD THEREOF

(75) Inventors: Heu-Gon Kim, Suwon-si (KR); In-Sun Hwang, Suwon-si (KR); Sung-Kyu Shim, Seoul (KR); Jin-Sung Choi, Cheonan-si (KR); Hyoung-Joo Kim, Euiwang-si (KR); Taek-Sun Shin, Cheonan-si (KR); Byung-Seo Yoon, Incheon (KR)

(73) Assignee: Samsung Electronics Co., Ltd. (KR)

( * ) Notice: Subject to any disclaimer, the term of this patent is extended or adjusted under 35 U.S.C. 154(b) by 304 days.

(21) Appl. No.: 11/875,249

(22) Filed: Oct. 19, 2007

(65) Prior Publication Data
US 2008/0094552 A1   Apr. 24, 2008

(30) Foreign Application Priority Data
Oct. 19, 2006   (KR) .................... 10-2006-0101865

(51) Int. Cl.
G02F 1/1335 (2006.01)
G09F 13/08 (2006.01)

(52) U.S. Cl. .................. 349/64; 349/65; 362/97.1; 362/97.2; 362/606; 362/607

(58) Field of Classification Search .............. 349/64, 349/65, 95; 362/606, 607, 620, 626, 97.1, 362/97.2
See application file for complete search history.

(56) References Cited

U.S. PATENT DOCUMENTS

| | | | |
|---|---|---|---|
| 5,396,350 A * | 3/1995 | Beeson et al. | 349/62 |
| 6,002,829 A * | 12/1999 | Winston et al. | 385/146 |
| 6,011,602 A | 1/2000 | Miyashita et al. | |
| 6,147,804 A | 11/2000 | Kashima et al. | |
| 6,222,689 B1 * | 4/2001 | Higuchi et al. | 359/837 |
| 2001/0035924 A1 * | 11/2001 | Fujieda | 349/65 |
| 2003/0133301 A1 * | 7/2003 | Mullen | 362/332 |
| 2005/0041410 A1 * | 2/2005 | Yamashita et al. | 362/31 |
| 2005/0280752 A1 | 12/2005 | Kim et al. | |

FOREIGN PATENT DOCUMENTS

| | | |
|---|---|---|
| DE | 199 15 209 A1 | 10/2000 |
| EP | 1 607 775 A1 | 12/2005 |
| GB | 2 337 628 A | 11/1999 |

OTHER PUBLICATIONS

European Search Report for Application No. 07020349.2-1234; Dated: Feb. 21, 2008.

* cited by examiner

*Primary Examiner*—Michael H Caley
(74) *Attorney, Agent, or Firm*—Cantor Colburn LLP (57) ABSTRACT

A backlight assembly includes a light source, a light-guide plate, a reflective sheet, a first prism sheet, a second prism sheet and a lateral reflective sheet. The light source generates light. The light-guide plate guides the light and has a plurality of first prism patterns adjacent to each other. The first prism patterns are formed on a first surface of the light-guide plate. The reflective sheet is disposed adjacent the first surface of the light-guide plate. The first and second prism sheets are disposed on a second surface of the light-guide plate. The lateral reflective sheet is disposed on the second prism sheet. The lateral reflective sheet includes reflective protrusions substantially parallel with a longitudinal direction of the light source. Therefore, brightness and display quality may be enhanced.

20 Claims, 7 Drawing Sheets

BACKLIGHT ASSEMBLY, LIQUID CRYSTAL DISPLAY APPARATUS HAVING THE SAME, AND METHOD THEREOF

This application claims priority to Korean Patent Application No. 2006-101865, filed on Oct. 19, 2006, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly, a liquid crystal display ("LCD") apparatus having the same, and a method thereof. More particularly, the present invention relates to a backlight assembly capable of enhancing brightness, an LCD apparatus having the backlight assembly, and a method thereof.

2. Description of the Related Art

In general, a liquid crystal display ("LCD") apparatus displays an image. The LCD apparatus has various characteristics, such as light weight, lower power consumption, lower driving voltage, etc., in comparison with other types of display apparatuses, such as cathode ray tube ("CRT") displays, plasma display panel ("PDP") displays, and so on. The LCD apparatus is widely used in various industrial fields.

The LCD apparatus is a non-emissive type display apparatus that requires a backlight assembly providing the LCD panel with light.

In general, the backlight assembly includes a lamp generating light, a light-guide plate guiding light generated from the lamp toward the LCD panel and a reflective sheet disposed under the light-guide plate. Also, the backlight assembly may further include one or two prism sheets for enhancing brightness, a diffusion sheet and a protecting sheet for enhancing display quality.

However, when the number of the optical sheets is increased, manufacturing costs increase. Also, thickness and weight of the LCD apparatus increase.

BRIEF SUMMARY OF THE INVENTION

The present invention provides a backlight assembly capable of enhancing brightness and thus image quality while reducing the number of the optical sheets.

The present invention also provides a liquid crystal display ("LCD") apparatus having the above-mentioned backlight assembly.

The present invention also provides a method of enhancing brightness of a display device.

According to exemplary embodiments of the present invention, a backlight assembly includes a light source, a light-guide plate, a reflective sheet, a first prism sheet, a second prism sheet and a lateral reflective sheet. The light source generates light. The light-guide plate guides the light generated from the light source, and has a plurality of first prism patterns adjacent to each other. The first prism patterns are formed on a first surface of the light-guide plate. The reflective sheet is disposed adjacent the first surface of the light-guide plate. The first and second prism sheets are disposed on a second surface of the light-guide plate. The lateral reflective sheet is disposed on the second prism sheet.

The lateral reflective sheet may include reflective protrusions substantially parallel with a longitudinal direction of the light source, which may be a lamp. For example, each of the reflective protrusions may have a substantially rectangular cross-section, such as a square cross-section, when viewed on a plane substantially perpendicular to the longitudinal direction. For example, a pitch of the reflective protrusions may be from about 1 μm to about 100 μm, and a height of the reflective protrusions may be from about 1 μm to about 100 μm. Also, a ratio of a width of the reflective protrusions to the pitch may be from about 10% to about 90%.

The first prism patterns may extend in a direction substantially perpendicular to the longitudinal direction of the lamp.

Second prism patterns adjacent to each other may be disposed on a second surface of the first prism sheet, where a first surface of the first prism sheet faces the light-guide plate. Third prism patterns adjacent to each other may be disposed on a second surface of the second prism sheet, where a first surface of the second prism sheet faces the second surface of the first prism sheet. The second prism patterns and the third prism patterns may extend along a direction substantially parallel with the longitudinal direction of the lamp.

According to other exemplary embodiments of the present invention, an LCD apparatus includes a lamp, a light-guide plate, a lateral reflective sheet, and an LCD panel. The lamp generates light. The light-guide plate guides the light generated from the lamp. The lateral reflective sheet is disposed on the light-guide plate and includes reflective protrusions disposed along a direction substantially parallel with a longitudinal direction of the lamp. The LCD panel displays an image and is disposed on the lateral reflective sheet. The LCD apparatus may further include first prism and second prism sheets disposed between the lateral reflective sheet and the light-guide plate and a reflective sheet disposed adjacent a first surface of the light-guide plate.

In still other exemplary embodiments of the present invention, a method of enhancing brightness of a backlight assembly for a display device, the backlight assembly including at least one optical sheet and the display device including a display panel, includes arranging a first surface of a lateral reflective sheet on the at least one optical sheet, and arranging a plurality of reflective protrusions on a second surface of the lateral reflective sheet to face the display panel, the plurality of reflective protrusions extending longitudinally across the second surface and spaced apart from each other.

According to the backlight assembly, the LCD apparatus having the backlight assembly, and the method thereof, brightness and display quality may be enhanced.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
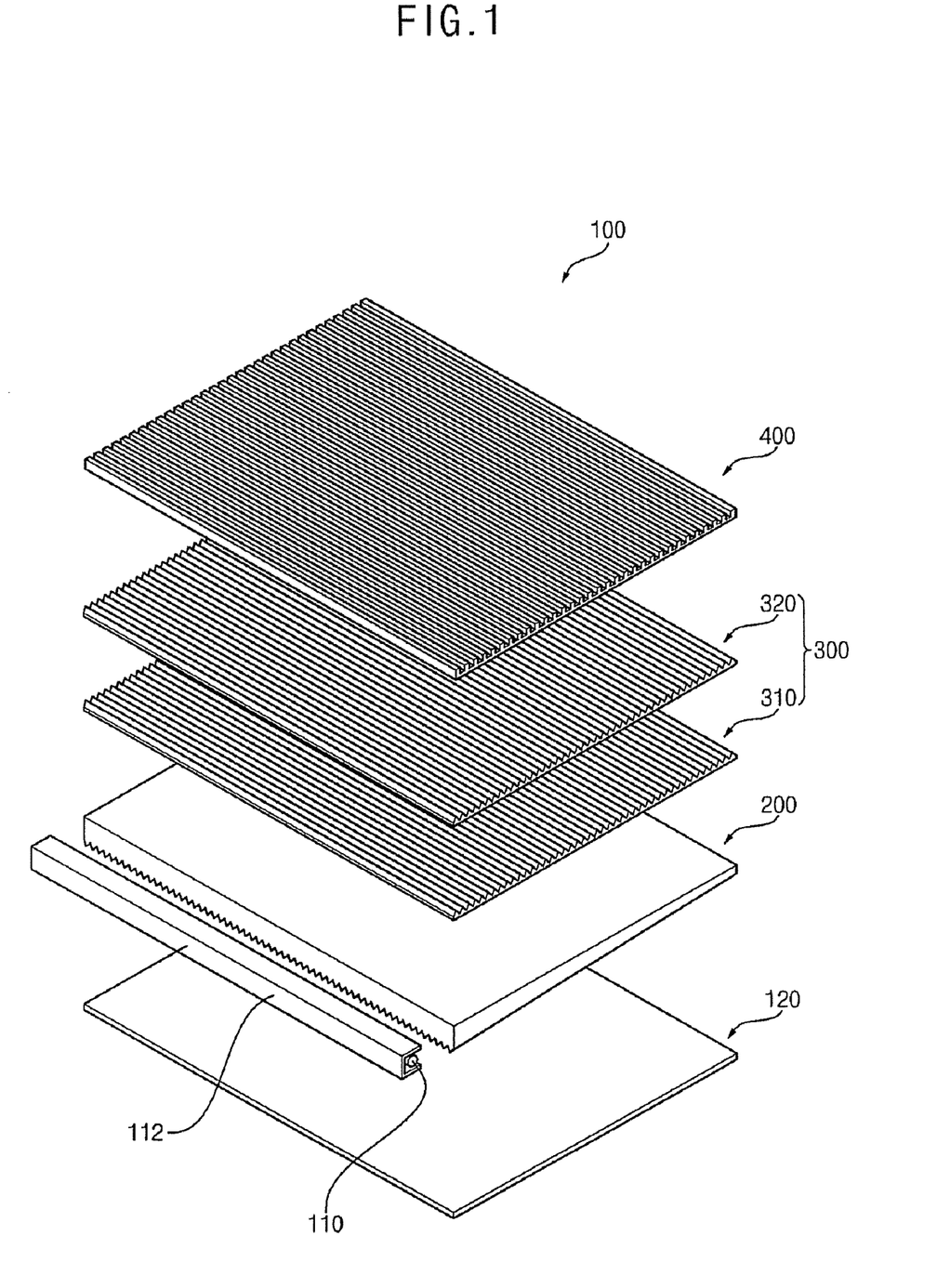
FIG. 1 is an exploded perspective view illustrating an exemplary backlight assembly in accordance with an exemplary embodiment of the present invention.
Figure 2:
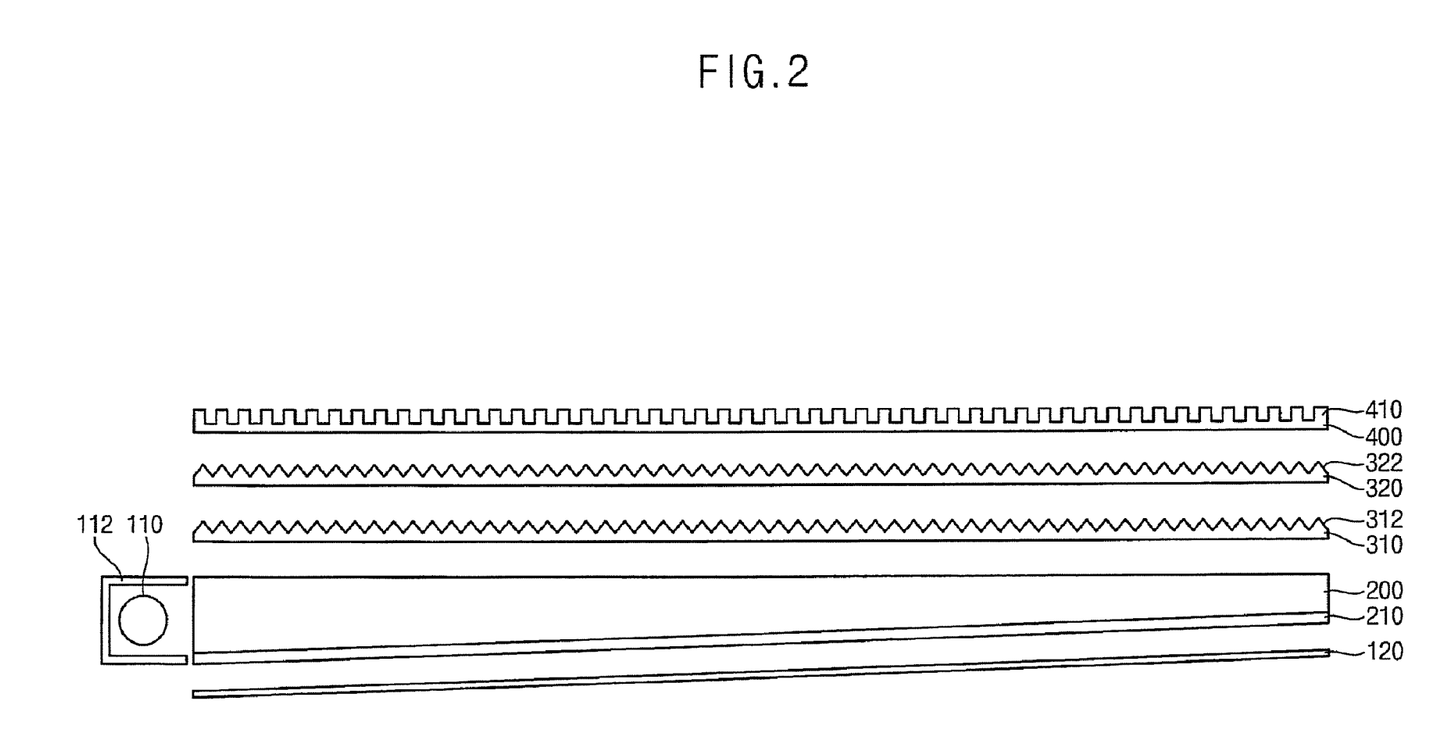
FIG. 2 is a cross-sectional view illustrating the exemplary backlight assembly in FIG. 1.

FIG. 1 is an exploded perspective view illustrating an exemplary backlight assembly in accordance with an exemplary embodiment of the present invention. FIG. 2 is a cross-sectional view illustrating the exemplary backlight assembly in FIG. 1.

Referring to FIGS. 1 and 2, a backlight assembly 100 in accordance with an exemplary embodiment of the present invention includes a lamp 110 generating light, a light-guide plate 200 guiding the light generated from the lamp 110 toward a front direction of the backlight assembly 100, a reflective sheet 120 disposed under the light-guide plate 200, an optical sheet 300 disposed on the light-guide plate 200, and a lateral reflective sheet 400 disposed on the optical sheet 300.

The lamp 110 may be disposed at one side of the light-guide plate 200. Alternatively, lamps 110 may be disposed at opposite sides of the light-guide plate 200. In still other alternative exemplary embodiments, lamps 110 may be provided on the reflective sheet 120 to form a direct-type of backlight assembly. The lamp 110 generates the light in response to a driving power applied from an external inverter (not shown). The lamp 110, for example, may include a cold cathode fluorescent lamp ("CCFL") of a thin and long cylinder shape. Alternatively, the lamp 110 may include an external electrode fluorescent lamp ("EEFL") having an electrode disposed at opposite sides. Alternatively, the lamp 110 or light source, for example, may include a plurality of light-emitting diodes ("LEDs").

As in the illustrated embodiment, the backlight assembly 100 may further include a lamp cover 112 covering three sides of the lamp 110 to protect the lamp 110. The lamp cover 112 protects the lamp 110 and simultaneously reflects light generated from the lamp 110 toward the light-guide plate 200. Thus, the lamp cover 112 may enhance efficiency of the light.

In the edge-type of backlight assembly, as shown, the light-guide plate 200 guides the light generated from the lamp 110 disposed at a side of the light-guide plate 200, and guides the light towards the front direction, such as towards a display panel. The light-guide plate 200 transfers light of a linear light source shape from the lamp 110 to light of a surface light source shape.

The light-guide plate 200, for example, may include a transparent material for minimizing loss of the light. Examples of the transparent material that may be used for the light-guide plate 200 include transparent polymethyl methacrylate ("PMMA"), polycarbonate ("PC"), etc.

When the lamp 110 is disposed at one side of the light-guide plate 200, the light-guide plate 200 may have a wedge shape. As a distance from the lamp 110 is increased, a thickness of the wedge shape of the light-guide plate 200 is decreased. When the lamp 110 is disposed at opposite sides of the light-guide plate 200, the light-guide plate 200 may have a constant thickness.

First prism patterns 210 adjacent to each other may be disposed on a first surface of the light-guide plate 200, facing the reflective sheet 120. For example, an extension direction of the first prism patterns 210 may be substantially perpendicular to a longitudinal direction of the lamp 110. A cross-section of the first prisms pattern 210 taken along a plane substantially perpendicular to the extension direction may have a substantially triangular shape.

The light generated from the lamp 110 to be guided toward the light-guide plate 200 is concentrated by the first prism patterns 210 disposed under the light-guide plate 200. The concentration direction of the guided light may be substantially parallel with the longitudinal direction of the lamp 110.

The reflective sheet 120 is disposed under the light-guide plate 200. The reflective sheet 120 reflects light leaked toward a lower direction of the light-guide plate 200 and may enhance light efficiency of the backlight assembly 100. For example, the reflective sheet 120 may include a material having high reflectivity. Examples of the material having high reflectivity that may be used for the reflective sheet 120 may include white polyethylene terephthalate ("PET"), white polycarbonate ("PC"), etc.

The optical sheet 300 is disposed on a second surface of the light-guide plate 200, such as between the light-guide plate 200 and a display panel. The optical sheet 300 may enhance brightness of the light exiting from the light-guide plate 200 and may enhance display quality of a liquid crystal display ("LCD") apparatus having the backlight assembly 100.

The optical sheet 300 may include a first prism sheet 310 and a second prism sheet 320.

The first prism sheet 310 has second prism patterns 312 disposed on a second surface of the first prism sheet 310. A first surface of the first prism sheet 310 faces the second surface of the light guide plate 200 and the second surface of the first prism sheet 310 faces the second prism sheet 320. The second prism patterns 312 are adjacent to each other. For example, the second prism patterns 312 may be disposed along an extension direction substantially parallel with the longitudinal direction of the lamp 110. For example, the second prism patterns 312 may have a triangular cross-section when viewed on a plane substantially perpendicular to the extension direction.

The second prism sheet 320 has third prism patterns 322 disposed on a second surface of the second prism sheet 320. A first surface of the second prism sheet 320 faces the second surface of the first prism sheet 320, and the second surface of the second prism sheet 320 is opposite the first surface of the second prism sheet 320. The third prism patterns 322 are adjacent to each other. For example, the third prism patterns 322 may be disposed along a direction substantially parallel with the longitudinal direction of the lamp 110. Thus, the third prism patterns 322 are substantially parallel with the second prism patterns 312. The third prism patterns 322 are substantially perpendicular to the first prism patterns 210 of the light-guide plate 200. For example, the third prism patterns 322 may have a triangular cross-section when viewed on a plane substantially perpendicular to the extension direction. Alternatively, the second prism patterns 312 and the third prism patterns 322 may have a rounded corner or a curved surface.

Figure 3:
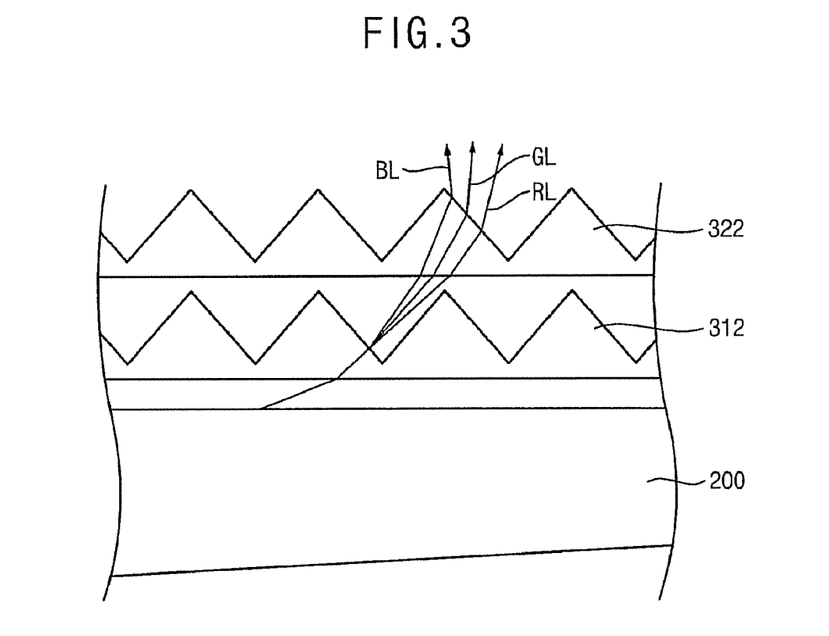
FIG. 3 is a cross-sectional view illustrating light rays concentrated by the exemplary first and second prism sheets in FIG. 2.

FIG. 3 is a cross-sectional view illustrating light rays concentrated by the exemplary first and second prism sheets in FIG. 2.

Referring to the FIGS. 2 and 3, a light ray exiting from the light-guide plate 200 is firstly concentrated toward the extension direction of the second prism patterns 312 of the first prism sheet 310. The extension direction of the second prism patterns 312 may be substantially parallel to the longitudinal direction of the lamp 110. Then, the firstly concentrated light ray is secondly concentrated to the extension direction by the third prism pattern 322 of the second prism sheet 320. For example, the light ray exiting from the light-guide plate 200 may firstly be concentrated through the first prism sheet 310 and may secondly be concentrated through the second prism sheet 320. An angle made by the light ray exiting from the light-guide plate 200 and having passed through the first prism sheet 310 may be from about 30° to about 32° with respect to the front direction that is substantially perpendicular to a light-exiting surface of the light-guide plate 200. The angle made by the light ray exiting from the light-guide plate 200 and having passed through the first and second prism sheets 310 and 320 with respect to the front direction may be about 0° with respect to the front direction that is substantially perpendicular to the light-exiting surface of the light-guide plate 200.

Thus, the light ray generated from the lamp 110 and incident into the light-guide plate 200 is concentrated toward the horizontal direction by the first prism patterns 210 disposed on the light-guide plate 200. The light ray generated from the lamp 110 and incident into the light-guide plate 200 is concentrated to the extension direction that is substantially perpendicular to the longitudinal direction by the first and second prism sheets 310 and 320. In other words, the light exits the second prism sheet 320 in a direction substantially perpendicular to a light exiting surface of the light guide plate 200.

However, when a wavelength of the light ray is changed, a refractive index of the light ray is also changed, so that color dispersion of the light ray exiting from the light-guide plate 200 and having passed through the first and second prism sheets 310 and 320 may be increased. A red light ray RL of a red wavelength, a green light ray GL of a green wavelength and a blue light ray BL of a blue wavelength have different refractive indexes in the first and second prism sheets 310 and 320. Thus, the red light ray RL of the red wavelength, the green light ray GL of the green wavelength and the blue light ray BL of the blue wavelength finally exiting from the second prism sheet 320 have different exiting angles.

Referring again to FIGS. 1 and 2, the backlight assembly 100 may further include a lateral reflective sheet 400 for decreasing the color dispersion that may be caused by the first and second prism sheets 310 and 320.

The lateral reflective sheet 400 is disposed on the second surface of the second prism sheet 320. In FIGS. 1 to 4, the lateral reflective sheet 400 includes a transparent resin. Examples of the transparent resin that may be used for the lateral reflective sheet 400 may include polymethyl methacrylate ("PMMA"), polycarbonate ("PC"), polyethylene terephthalate ("PET"), etc.

Figure 4:
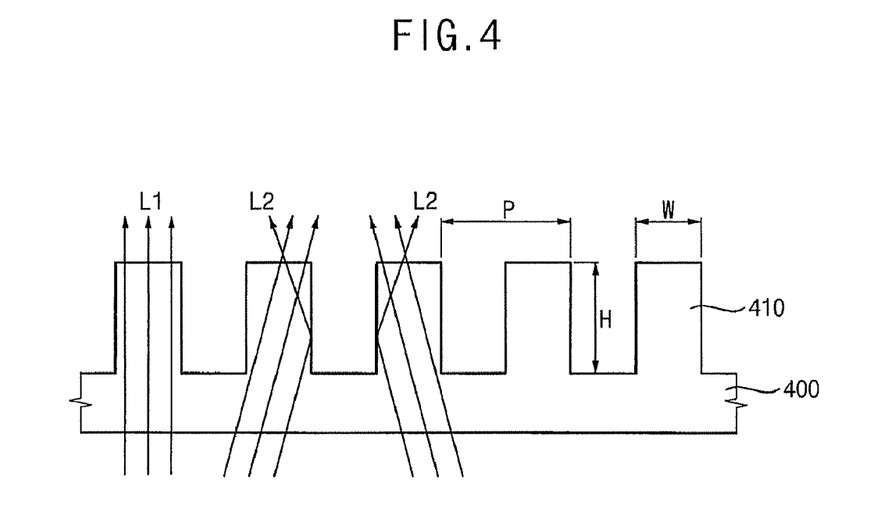
FIG. 4 is an enlarged cross-sectional view illustrating an exemplary lateral reflective sheet in FIG. 2.

FIG. 4 is an enlarged cross-sectional view illustrating an exemplary lateral reflective sheet in FIG. 2.

The lateral reflective sheet 400 includes reflective protrusions 410 disposed along a direction substantially parallel with the longitudinal direction of the lamp 110. The reflective protrusions 410 are provided on a second surface of the lateral reflective sheet 400, which is opposite a first surface of the lateral reflective sheet 400 that faces the second surface of the second prism sheet 320. The first surface of the lateral reflective sheet 400 may be substantially planar.

Referring to FIGS. 2 and 4, the reflective protrusions 410 of the lateral reflective sheet 400 have various shapes according to their pitch P, width W and height H. For example, each of the reflective protrusions 410 may have a rectangular-shaped cross-section, such as a square cross-section, when viewed on a plane substantially perpendicular to the longitudinal direction of the lamp 110. For example, the pitch P of the reflective protrusions 410 may be from about 1 μm to about 100 μm, and the height H of the reflective protrusions 410 may be from about 1 μm to about 100 μm. For example, a ratio of the width W to the pitch P of the reflective protrusions 410 may be from about 10% to about 90%. The reflective protrusions 410 may be formed through a nanoimprint lithography method, although other methods of forming the reflective protrusions 410 are also within the scope of these embodiments.

The light exiting from the second prism sheet 320 includes a light ray L1 vertically incident into the lateral reflective sheet 400, and a light ray L2 incident into the lateral reflective sheet 400 in an inclined direction. The light ray L1 vertically incident into the lateral reflective sheet 400 exits the lateral reflective sheet 400 in a vertical direction without any change in an exiting angle of the light ray L1. The light ray L2 incident into the lateral reflective sheet 400 in the inclined direction is partially reflected from a side surface of the reflective protrusions 410 so that an exiting angle of a portion of the light ray L2 is reversed. The exiting angle of the light having passed through the lateral reflective sheet 400 is widely distributed by a mirror effect of the lateral reflective sheet 400.

Figure 5:
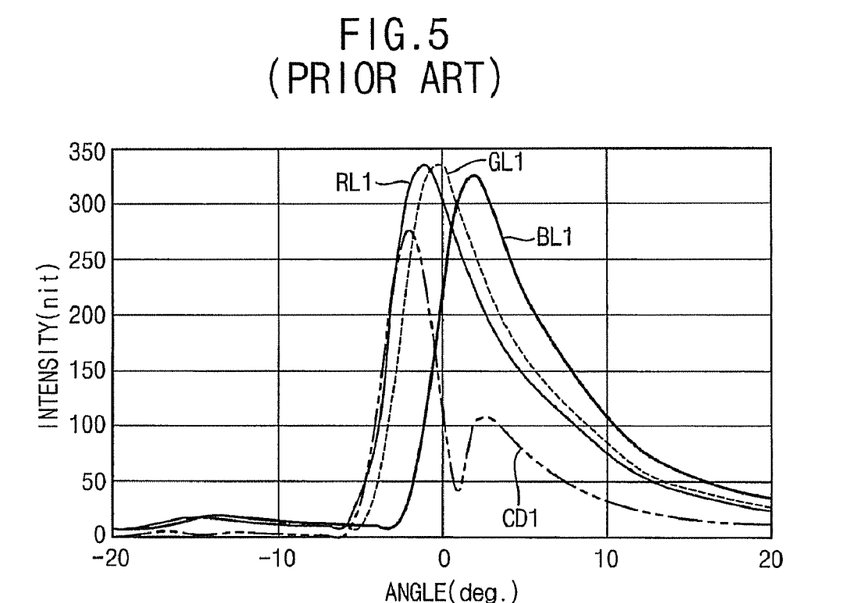
FIG. 5 is a graph illustrating a relationship between an exiting angle and an intensity of light having various wavelengths and having passed through a diffusing sheet of a conventional backlight assembly of the prior art without a lateral reflective sheet.
Figure 6:
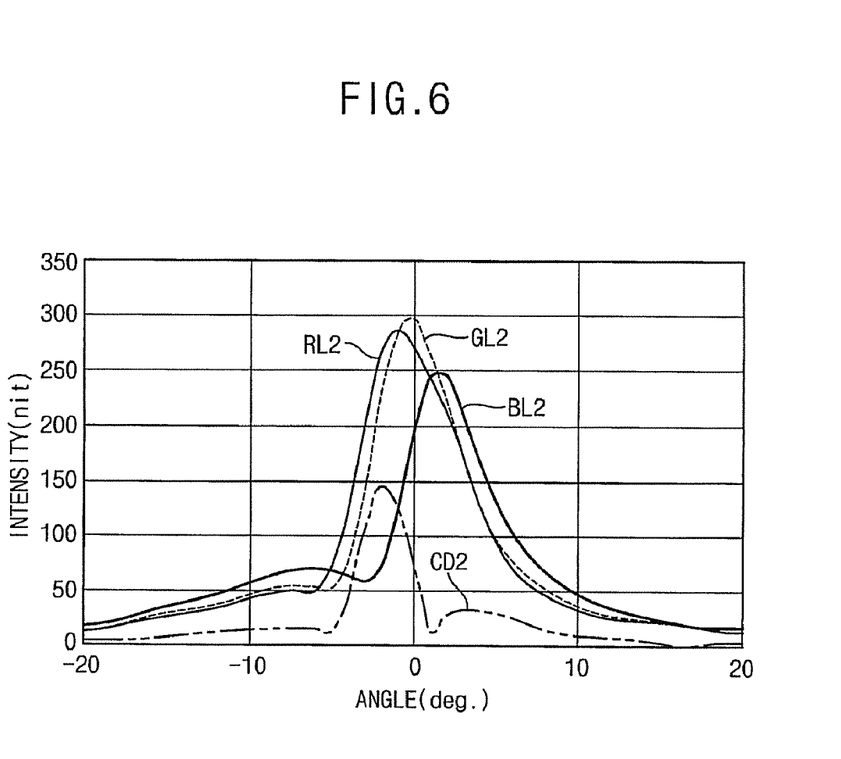
FIG. 6 is a graph illustrating a relationship between an exiting angle and an intensity of light having various wavelengths and having passed through an exemplary lateral reflective sheet.
Figure 7:
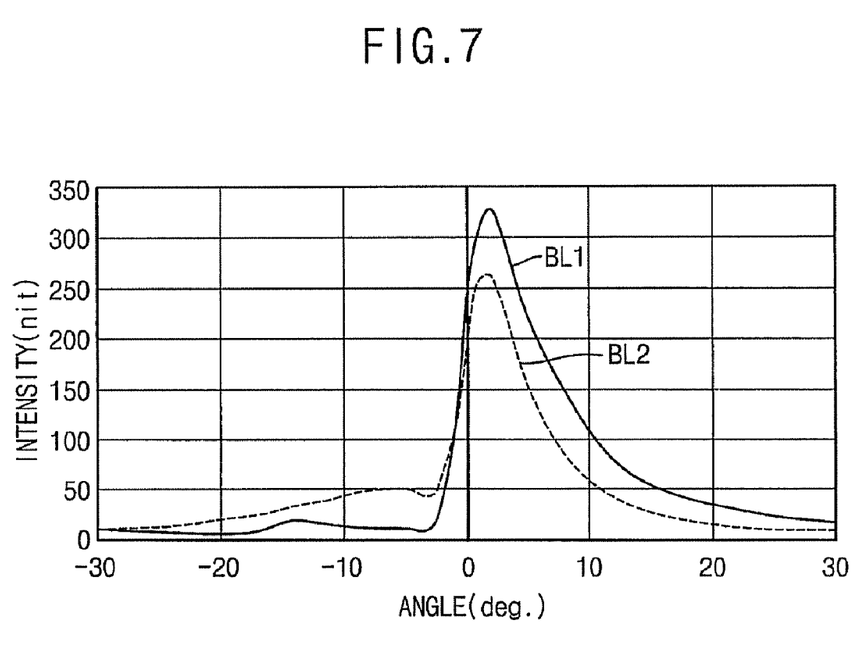
FIG. 7 is a graph illustrating a relationship between an exiting angle and an intensity of blue light having various wavelengths shown in FIGS. 5 and 6.

FIG. 5 is a graph illustrating a relationship between an exiting angle and an intensity of light having various wavelengths and having passed through a diffusing sheet of a conventional backlight assembly of the prior art without a lateral reflective sheet. FIG. 6 is a graph illustrating a relationship between an exiting angle and an intensity of light having various wavelengths and having passed through an exemplary lateral reflective sheet. FIG. 7 is a graph illustrating a relationship between an exiting angle and an intensity of blue light having various wavelengths shown in FIGS. 5 and 6.

Referring to FIG. 5, when the backlight assembly does not include the lateral reflective sheet 400, a blue light ray BL1 having a blue wavelength of about 436 nm, a green light ray GL having a green wavelength of about 544 nm and a red light ray RL1 having a red wavelength of about 612 nm have different exiting angles from each other, thereby increasing color dispersion. When the exiting angle adjacent to a left side of the backlight assembly is greater than the exiting angle adjacent to a right side of the backlight assembly with respect to the front direction, a color deviation CD1 is increased and color dispersion is widely displayed. Color dispersion deteriorates display quality of a display panel in a region where the color deviation CD1 is rapidly changed. For example, the red light ray RL1 of the red wavelength may have the strongest color deviation, so that a reddish image is displayed on the backlight assembly.

Referring to FIG. 6, when the backlight assembly includes the lateral reflective sheet 400, color dispersion may be reduced compared with the backlight assembly of FIG. 5, which does not include the lateral reflective sheet 400. When the backlight assembly includes the lateral reflective sheet 400, a color deviation CD2 may be substantially reduced compared with the backlight assembly of FIG. 5, which does not include the lateral reflective sheet 400. For example, when the backlight assembly does not include the lateral reflective sheet 400, a maximum value of the color deviation CD1 may be about 278 nit. However, when the backlight assembly includes the lateral reflective sheet 400, a maximum value of the color deviation CD2 may be about 145 nit. Thus, by including the lateral reflective sheet 400, the color deviation may be reduced by about 52%.

In FIG. 7, the relationship between the exiting angle and the intensity of the blue light rays BL1 and BL2 having the blue wavelength in FIGS. 5 and 6 is illustrated. Referring to FIG. 7, when the exemplary backlight assembly includes the lateral reflective sheet 400, the blue light ray BL2 having the blue wavelength in the exemplary backlight assembly having the lateral reflective sheet 400 is smaller in intensity than that of the backlight assembly without the lateral reflective sheet 400 at the right side of the exemplary backlight assembly, and is greater in intensity than that of the backlight assembly without the lateral reflective sheet 400 at the left side of the exemplary backlight assembly with respect to the center of the exemplary backlight assembly, which corresponds to about 0° in the graph in FIG. 7. When the exemplary backlight assembly includes the lateral reflective sheet 400, an exiting light ray toward the right side is reflected from the side surface of the lateral reflective sheet 400 to be guided towards the left side by a mirror effect of the lateral reflective sheet 400.

When the exiting light ray toward the right side is guided toward the left side by the mirror effect of the lateral reflective sheet 400, the color deviation may be reduced to enhance the color dispersion.

Figure 8:
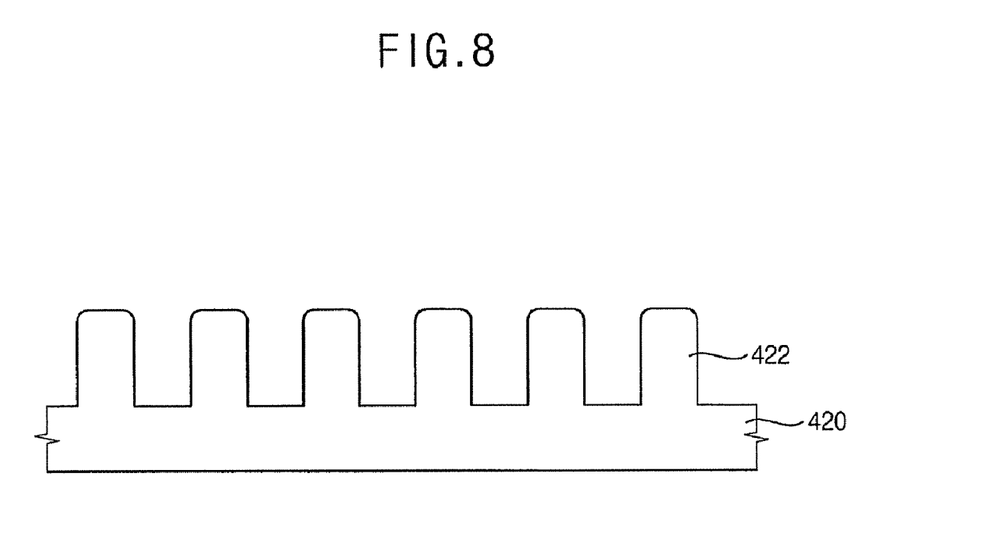
FIG. 8 is a cross-sectional view illustrating an exemplary lateral reflective sheet in accordance with another exemplary embodiment of the present invention.

FIG. 8 is a cross-sectional view illustrating an exemplary lateral reflective sheet in accordance with another exemplary embodiment of the present invention.

Referring to FIG. 8, an upper corner or upper corners of reflective protrusions 422 of a lateral reflective sheet 420 in accordance with another exemplary embodiment are rounded. Except for the rounded corner or corners of the reflective protrusions 422, the present embodiment is substantially the same as that in FIG. 4. Thus, any further explanation concerning the above elements will be omitted.

Figure 9:
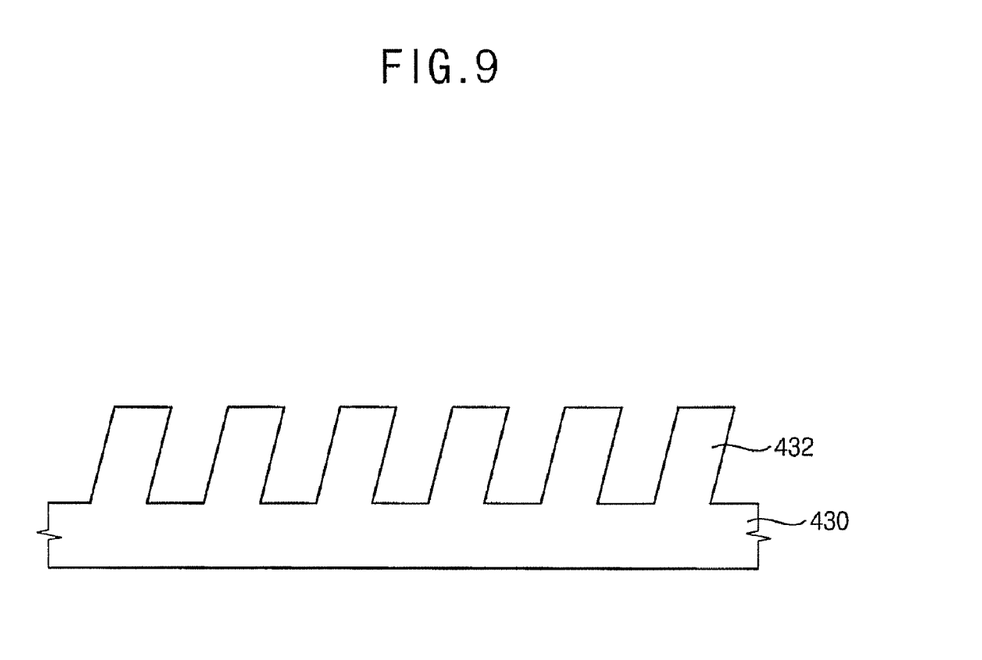
FIG. 9 is a cross-sectional view illustrating an exemplary lateral reflective sheet in accordance with still another exemplary embodiment of the present invention.

FIG. 9 is a cross-sectional view illustrating an exemplary lateral reflective sheet in accordance with still another exemplary embodiment of the present invention.

Referring to FIG. 9, a cross-section of each of reflective protrusions 432 of a lateral reflective sheet 430 in accordance with still another exemplary embodiment has a parallelogram shape when viewed on a plane substantially perpendicular to an extension direction of the reflective protrusions 432. For example, the reflective protrusions 432 may be inclined at an angle from about 1° to about 10° with respect to a front direction. For example, the reflective protrusions 432 may be inclined toward the lamp 110 (shown in FIG. 1) or in an opposite direction from the lamp 110. In an alternative embodiment, the reflective protrusions 432 may include the rounded upper corner or corners as described with respect to FIG. 8. The present embodiment is substantially the same as that in FIG. 4, except that the reflective protrusions 432 have an inclined shape. Thus, any further explanation concerning the above elements will be omitted.

Figure 10:
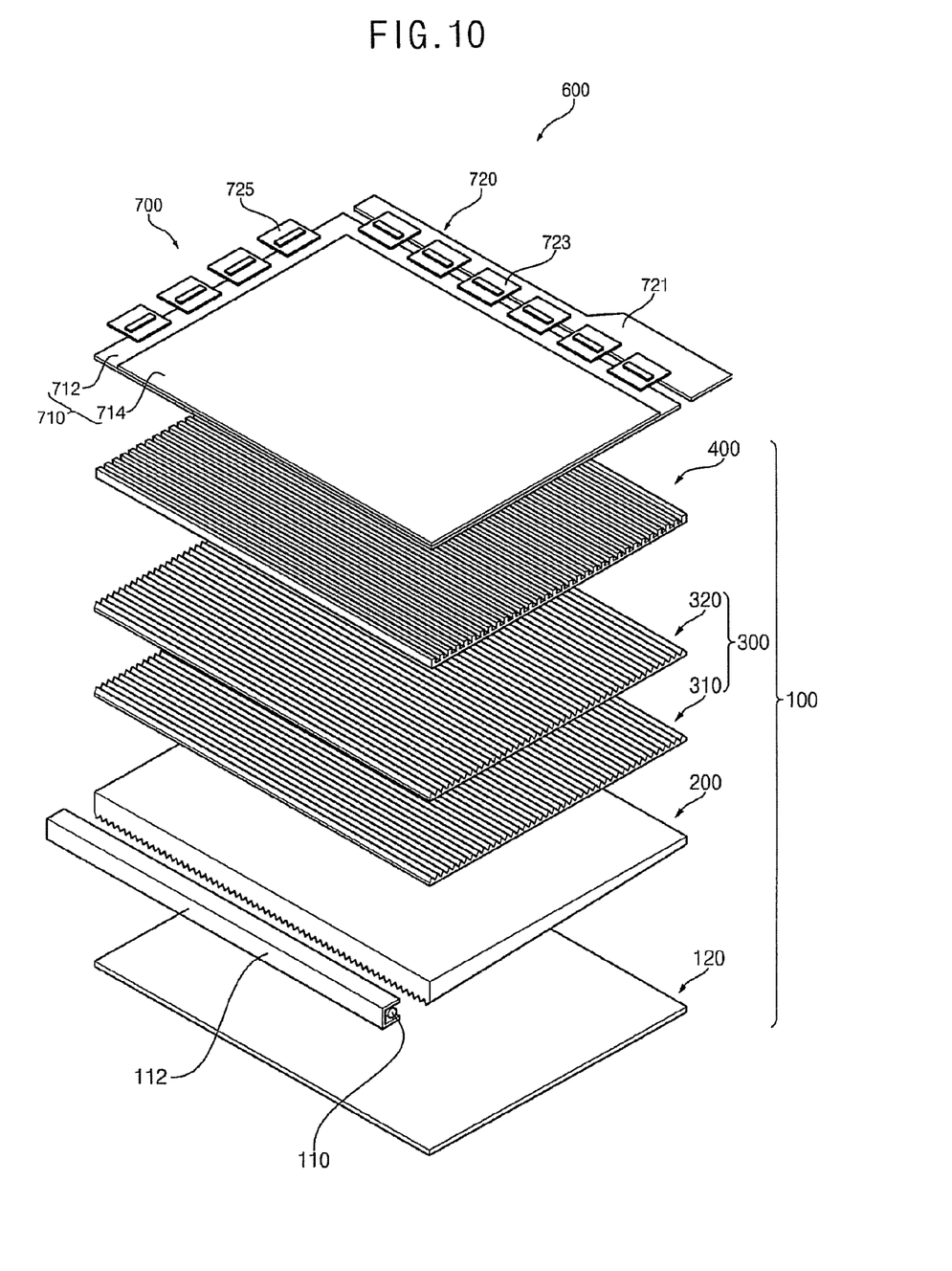
FIG. 10 is an exploded perspective view illustrating an exemplary liquid crystal display ("LCD") apparatus in accordance with an exemplary embodiment of the present invention.

FIG. 10 is an exploded perspective view illustrating an exemplary LCD apparatus in accordance with an exemplary embodiment of the present invention.

Referring to FIG. 10, an LCD apparatus 600 includes a backlight assembly 100 generating light and a display unit 700 displaying an image using the light generated from the backlight assembly 100.

The backlight assembly 100 may include a lamp 110 generating light, a light-guide plate 200 guiding the light generated from the lamp toward a front direction of the backlight assembly 100, a reflective sheet 120 disposed under the light-guide plate 200, at least one optical sheet 300 disposed on the light-guide plate 200 and a lateral reflective sheet 400 disposed on the optical sheet 300. The backlight assembly 100 is substantially the same as that in FIG. 1, and may include any of the alternative exemplary embodiments previously described. Thus, any further explanation concerning the above elements will be omitted.

The display unit 700 includes an LCD panel 710 displaying the image by using the light from the backlight assembly 100 and a driving circuit part 720 for driving the LCD panel 710.

The LCD panel 710 is disposed on the lateral reflective sheet 400. The LCD panel 710 includes a first substrate 712, a second substrate 714 opposite to the first substrate 712 and liquid crystal (not shown) interposed between the first substrate 712 and the second substrate 714. The second substrate 714 is combined with the first substrate 712 to interpose the liquid crystal.

The first substrate 712 may include a thin-film transistor ("TFT") substrate having a switching device that is a TFT. The TFT may be disposed in a matrix configuration. A source electrode of the TFT is electrically connected to a data line. A gate electrode of the TFT is electrically connected to a gate line. A drain electrode is electrically connected to a pixel electrode that includes a transparent conductive material.

The second substrate 714 may include a color filter substrate having red-green-blue ("RGB") color filters. The RGB color filters may have a thin-film shape to display a color image. The second substrate 714 may further include a common electrode including a transparent conductive material. Alternatively, the color filter may be disposed on the first substrate 712.

In the LCD panel 710 having the above elements, when electric power is applied to the gate electrode of the TFT, the TFT is turned on so that an electric field is formed between the pixel electrode and the common electrode. Liquid crystal molecules of the liquid crystal layer between the first substrate 712 and the second substrate 714 are changed by the electric field. According to the change of the liquid crystal molecules, transmissivity of the light generated from the backlight assembly 100 is changed, thereby displaying the image on the LCD panel 710.

The driving circuit part 720 may include a source printed circuit board ("PCB") 721 outputting signals for driving the LCD panel 710, a data driving circuit film 723 connecting the source PCB 721 to the LCD panel 710, and a gate driving circuit film 725 electrically connected to the LCD panel 710.

The data driving circuit film 723 is electrically connected to the data line of the first substrate 712. The gate driving circuit film 725 is electrically connected to the gate line of the first substrate 712. The data driving circuit film 723 and the gate driving circuit film 725 may include a driving chip. The driving chip outputs driving signals for driving the LCD panel 710 in response to control signals from the source PCB 721. For example, the data driving circuit film 723 and the gate driving circuit film 725 may include a tape carrier package ("TCP") or a chip-on-film ("COF").

Alternatively, the driving circuit part 720 may further include a gate PCB (not shown) electrically connected to the gate driving circuit film 725.

According to the backlight assembly and the LCD apparatus having the backlight assembly, the backlight assembly includes two prism sheets and a lateral reflective sheet so that brightness and display quality may be enhanced. Also, a method of enhancing brightness and display quality of a display device is made possible, such as by arranging the lateral reflective sheet between the optical sheets and the display panel.

Also, a reddish image caused by color dispersion may be reduced by using a mirror effect of the lateral reflective sheet.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A backlight assembly comprising:
    a light source generating light;
    a light-guide plate guiding the light generated from the light source toward a second surface of the light-guide plate and having a plurality of first prism patterns adjacent to each other, the first prism patterns formed on a first surface of the light-guide plate, the first surface being opposite to the second surface of the light-guide plate; and
    a lateral reflective sheet disposed over the second surface of the light-guide plate and comprising reflective protrusions each defined by opposing side surfaces substantially parallel to each other and protruding in a direction opposite to the second surface of the light-guide plate; and
    an optical sheet disposed between the light-guide plate and the lateral reflective sheet.

2. The backlight assembly of claim 1, wherein the light source is a lamp, and the lateral reflective sheet comprises reflective protrusions substantially parallel with a longitudinal direction of the lamp.

3. The backlight assembly of claim 2, wherein each of the reflective protrusions has a substantially rectangular cross-section when viewed on a plane substantially perpendicular to the longitudinal direction of the lamp.

4. The backlight assembly of claim 3, wherein a pitch of the reflective protrusions is from about 1 μm to about 100 μm.

5. The backlight assembly of claim 4, wherein a ratio of a width of the reflective protrusions to the pitch of the reflective protrusions is from about 10% to about 90%.

6. The backlight assembly of claim 5, wherein a height of the reflective protrusions is from about 1 μm to about 100 μm.

7. The backlight assembly of claim 3, wherein the reflective protrusions have a rounded corner.

8. The backlight assembly of claim 2, wherein a cross-section of each of the reflective protrusions has a substantially parallelogram shape when viewed on a plane substantially perpendicular to the longitudinal direction of the lamp.

9. The backlight assembly of claim 2, wherein the first prism patterns extend along a direction substantially perpendicular to the longitudinal direction of the lamp.

10. The backlight assembly of claim 9, further comprising first and second prism sheets disposed between the light-guide plate and the lateral reflective sheet, and wherein a first surface of the first prism sheet faces the second surface of the light-guide plate, and a second surface of the first prism sheet comprises second prism patterns adjacent to each other, and a first surface of the second prism sheet faces the first prism sheet, and a second surface of the second prism sheet comprises third prism patterns adjacent to each other.

11. The backlight assembly of claim 10, wherein the second prism patterns and the third prism patterns extend along a direction substantially parallel with the longitudinal direction of the lamp and are substantially perpendicular to the first prism patterns.

12. The backlight assembly of claim 2, wherein thickness of the light-guide plate decreases as a distance from the lamp increases.

13. The backlight assembly of claim 1, further comprising first and second prism sheets disposed between the light-guide plate and the lateral reflective sheet, and wherein the lateral reflective sheet includes a first surface facing the first and second prism sheets, and a second surface opposite the first surface, the second surface including a plurality of reflective protrusions which are spaced from each other.

14. The backlight assembly of claim 13, wherein the first and second prism sheets include second and third prism patterns, respectively, and the plurality of reflective protrusions extend substantially parallel to the second and third prism patterns.

15. A liquid crystal display apparatus comprising:
a lamp generating light;
a light-guide plate guiding the light generated from the lamp;
a lateral reflective sheet disposed on the light-guide plate and including reflective protrusions each defined by opposing side surfaces substantially parallel to each other and protruding in a direction opposite to the light-guide plate and disposed along a direction substantially parallel with a longitudinal direction of the lamp;
at least one optical sheet disposed between the light-guide plate and the lateral reflective sheet; and
a liquid crystal display panel that displays an image and is disposed on the lateral reflective sheet.

16. The liquid crystal display apparatus of claim 15, wherein each of the reflective protrusions has a substantially rectangular cross-section when viewed on a plane substantially perpendicular to the longitudinal direction of the lamp.

17. The liquid crystal display apparatus of claim 16, wherein the reflective protrusions have a pitch from about 1 µm to about 100 µm, and a height from about 1 µm to about 100 µm, and a ratio of a width of the reflective protrusions to the pitch of the reflective protrusions is from about 10% to about 90%.

18. The liquid crystal display apparatus of claim 17, wherein the light-guide plate includes a first surface and an opposite second surface through which the light exits, the lateral reflective sheet is disposed on the second surface of the light-guide plate, and the first surface of the light-guide plate includes first prism patterns adjacent to each other and extending in a direction substantially perpendicular to the longitudinal direction of the lamp.

19. The liquid crystal display apparatus of claim 18, further comprising:
a reflective sheet adjacent the first surface of the light-guide plate.

20. The liquid crystal display apparatus of claim 19, wherein the at least one optical sheet comprises:
a first prism sheet having a first surface facing the second surface of the light-guide plate and a second surface, the second surface of the first prism sheet including second prism patterns; and
a second prism sheet having a first surface facing the second surface of the first prism sheet and a second surface, the second surface of the second prism sheet including third prism patterns
wherein the second prism patterns and the third prism patterns extend along a direction substantially parallel with the longitudinal direction of the lamp.

* * * * *